United States Patent [19]

Renkema et al.

[11] Patent Number: 5,364,916
[45] Date of Patent: Nov. 15, 1994

[54] CATALYST AND PROCESS FOR THE PREPARATION OF AN OLEFIN POLYMER

[75] Inventors: Jacob Renkema, Sittard; Jeroen H. G. Konings, Stein; Bernardus J. Muskens, Geleen, all of Netherlands

[73] Assignee: DSM N.V., Heerlen, Netherlands

[21] Appl. No.: 942,319

[22] Filed: Sep. 10, 1992

[30] Foreign Application Priority Data

Sep. 11, 1991 [NL] Netherlands ............... 9101536

[51] Int. Cl.$^5$ ............................................. B01J 27/24
[52] U.S. Cl. ..................... 526/161; 502/167; 502/103
[58] Field of Search ............... 526/161; 502/103, 167

[56] References Cited

U.S. PATENT DOCUMENTS

| | | |
|---|---|---|
| 3,622,548 | 11/1971 | Emde et al. . |
| 3,646,000 | 2/1972 | Horvath ............................ 260/93.7 |
| 3,883,493 | 5/1975 | Yamao et al. . |
| 4,347,159 | 8/1982 | Nudenberg et al. . |
| 4,361,686 | 11/1982 | Zaar et al. . |
| 4,435,552 | 3/1984 | Evens . |
| 5,086,023 | 2/1992 | Smith ................................ 502/103 |
| 5,122,493 | 6/1992 | Saba et al. . |

OTHER PUBLICATIONS

D. C. Devore et al, "Complexes of (arylimido)vanadium(V). Synthetic, structural, spectroscopic, and theoretical studies of V(Ntol)C13 and derivatives", J. Am. Chem. Soc. 1987, vol. 109, pp. 7408–7416.

F. Radwan et al, "Polymerization of ethylene with vanadium(III) amide", Chemical abstracts, Oct. 1980, vol. 93, No. 14, pp. 465–469.

*Primary Examiner*—Asok Pal
*Attorney, Agent, or Firm*—Cushman, Darby & Cushman

[57] ABSTRACT

The present invention relates to a catalyst and a process for the preparation of an olefin polymer, which catalyst comprises a transition metal component and an organometal component. The transition metal component comprises a transition metal atom onto which an imidoaryl ligand is bound.

More specifically the transition metal is vanadium or titanium.

18 Claims, No Drawings

CATALYST AND PROCESS FOR THE PREPARATION OF AN OLEFIN POLYMER

BACKGROUND OF THE INVENTION

1. Field of the Invention

The present invention relates to a catalyst that is suitable for the preparation of an olefin polymer, which catalyst comprises a transition metal component and an organometal component. In a preferred embodiment, the present invention is related to a catalyst that is suitable for the preparation of a polymer, based on α-olefin. In a more preferred embodiment, the present invention relates to a catalyst that is suitable for the preparation of an amorphous copolymer of ethylene, an α-olefine and optionally a diene, which catalyst comprises a vanadium component and an aluminum component.

2. Background Information

Catalysts containing a vanadium component and an aluminum component are known in the art. They are used to obtain crystalline as well as amorphous olefin-polymers. Such catalysts are used to prepare the aforementioned amorphous copolymers, via a so-called Ziegler-Natta polymerization process. This process leads to the formation of both amorphous ethylene/α-olefine copolymers (also known as EAM rubbers) and amorphous ethylene/α-olefine/diene terpolymers (also known as EADM rubbers). As α-olefine, use is often made of propylene, which leads to the formation of EP or EPDM rubbers. An example of such a catalyst and such a process is found in U.S. Pat, No. 4,435,552, which teaches that the most suitable catalyst for such a polymerization consists of a vanadium component and an alkyl aluminum halide.

These known catalysts, however, have several drawbacks. One drawback of such catalysts is that their activity is poor and large amounts of organometal component are required to be used.

In the present invention, a new catalyst has been found, which leads to a different type of catalytic behavior from known catalysts. A catalyst of the present invention when used under process conditions analogous to known catalysts, yields a very different polymer from what known catalysts would yield, due to the unique composition of the catalyst.

SUMMARY OF THE INVENTION

The present invention relates to a catalyst, suitable for the preparation of an olefin polymer, which catalyst comprises a transition metal component and an organometal component. The transition metal component comprises a transition metal atom onto which an imidoaryl ligand is bound to form a complex.

The present invention further relates to a catalyst, suitable for the preparation of an amorphous copolymer of ethylene, an α-olefine and optionally a diene, which catalyst comprises a vanadium component and an aluminum component. Furthermore, the vanadium component comprises a vanadium atom onto which an imidoaryl ligand is bound.

The present invention additionally relates to the process for the preparation of an olefin polymer comprising polymerizing an olefin or mixtures of olefins with the aid of a catalyst. The catalyst comprises a transition metal component and an organometal metal component. The transition metal component comprises a transition metal atom onto which an imidoaryl ligand is bound to form a complex.

DETAILED DESCRIPTION OF THE INVENTION

The catalyst according to the present invention comprises a transition metal component and an organometal component. The transition metal component consists of a transition metal atom onto which an imidoaryl ligand is bound. In a preferred embodiment, the transition metal component comprises a vanadium atom or a titanium atom onto which the imidoaryl ligand is bound.

By combining such a transition metal/imidoaryl complex and, in particular, such a vanadium- or titanium-imidoaryl complex with an organometal component and more specifically with an organo-aluminum component, a unique catalyst is obtained which is useful in Ziegler-Natta polymerization processes.

Vanadium/imidoaryl complexes are known in the art. For example, see the publication by D. D. Devote et al. in J. Am. Chem-Soc. vol. 109 (24), pp. 7408–7416 (1987). However, such complexes have received academic interest only and have not yet been used for technical purposes, such as for a Ziegler-Natta polymerization process.

As used in the present invention, a transition metal-/imidoaryl complex is understood to be the group of compounds which has the following general formula:

$$Ar-N=Me-X_mY_n$$

(m+n equals the valency of the Me-imido group) wherein:

Ar stands for an aryl group, either substituted or unsubstituted;
Me stands for a transition metal;
X stands for a halogen group;
Y stands for an alkoxide, aryloxide, an amide or an organometallic group or a different ligand group, which is described below; and
Ar—N= in the above formula stands for the imidoaryl ligand.

As the aryl group, use can be made of groups that contain a benzene nucleus, which can be substituted in one or more places. Examples of suitable groups include, for example, tolyl, phenyl, and naphthalyl groups. Suitable substituents for such groups include, but are not limited to, alkyl, aralkyl, alkoxide, aryloxide, halogen, amino, nitro, thiol, and carboxyl groups. Other suitable substituents are known to those skilled in the art, who can easily determine their suitability. Preferably, the aryl group consists of an o-o-disubstituted phenyl group. The substituents are then preferably an alkyl group, such as methyl, ethyl, isopropyl, or isobutyl.

The transition metal group (that is, the Me-group in the general formula) is chosen from groups 3–6 of the Periodic Table of Elements (according to the New IUPAC Notation as given in Handbook of Chemistry and Physics, 70th Ed. 1989-1990). Preferably the transition metal is chosen from the group Ti, Zr, Hf, V, Nb, Ta and Cr. More preferred is V or Ti as transition metal. For use in the preparation of amorphous copolymers the most preferred transition metal is V.

One or more halogen atoms (that is, the X group in the general formula) can also be bound to the transition metal atom. Suitable halogen atoms can be chosen from the group comprising F, Cl, Br and I.

Preferably, the transition metal component of the catalyst of the present invention contains at least 2 halogen groups, more preferably at least 2 chlorine groups, which are bound to the transition metal atom. Mixtures of the aforementioned halogens can also be used.

In addition, the transition metal atom can be provided with a third group (the Y group in the above general formula). This third group can be chosen from the group comprising alkoxide, aryloxide, amide or an organometallic group. Mixtures of these Y groups can also be used.

Suitable vanadium/imidoaryl complexes are also disclosed in Devote et al. mentioned above. This article also indicates how such complexes can be prepared. For example, the reaction of $VOCl_3$ with para-substituted arylisocyanates can be employed in obtaining such a complex.

The catalyst also comprises an organometal component from groups 1, 2, 12 or 13 of the Periodic Table of Elements (again according to the New IUPAC Notation) as a co-catalyst. At least one hydrocarbon group is bound directly via a C-atom to the metal atom. Suitable compounds of such metals are, for instance, the compounds of sodium, lithium, zinc and magnesium and in particular aluminum. The hydrocarbon group bound to the metal atom in these compounds will preferably contain 1 to 30 carbon atoms, in particular 1 to 10 carbon atoms.

Examples of suitable compounds are amyl sodium, butyl lithium, diethyl zinc, butyl magnesium chloride and dibutyl magnesium. Preference is given to organo-aluminum compounds, notably trialkyl aluminum compounds (such as triethyl aluminum), alkyl aluminum hydrides (such as diisobutyl aluminum hydride), alkyl alkoxy aluminum compounds, and halogen-containing aluminum compounds (such as diethyl aluminum chloride, diisobutyl aluminum chloride, monoethyl aluminum dichloride and ethyl aluminum sesquichloride). Mixtures of such compounds can also be used.

The amount and the type of organometal component chosen are important for obtaining a suitable catalyst. For example, use of a vanadium-imidoaryl complex in which at least 2 halogen atoms are bound to the vanadium atom leads to an excellent catalyst if the atomic ratio of the vanadium and the effective aluminum is chosen to be between 3:1 and 1:3, preferably between 1:1 and 1:2. The ratios conventionally used in the art, in contrast, are between 1:5 and 1:50 (see for example, the examples in the aforementioned U.S. Pat. No. 4,435,552).

The term 'effective aluminum' as used in the present invention is understood to stand for the amount of the supplied aluminum that remains after correction for the presence of other Lewis acids or Lewis bases in the catalyst or in the reaction system during polymerization. The amount of aluminum component that then remains for the effective alkylation of the vanadium component (which, it is believed, leads to the formation of the active catalyst) is then related to the amount of vanadium component according to the aforementioned ratio.

In the presence of a Lewis acid (such as $BCl_3$, $GaCl_3$, $GaBr_3$, $AlBr_3$, $AlCl_3$, or $SiCl_4$) or a Lewis base (such as water, ester, ether, alcohol, amine, S-compounds such as sulphide or sulphite, or P-compounds such as phosphine or phosphite), some of aluminum component is inactivated, which leads to a corresponding decrease in the amount of aluminum component available for the alkylation of the vanadium component.

It has, thus, proved impossible to obtain such a low atomic ratio of the vanadium and the effective aluminum using catalysts known in the art. Such catalysts then have no or virtually no catalytic activity for the polymerization referred to herein.

Because the catalyst of the present invention allows for the use of a low Al/vanadium ratio as described above, a much smaller amount of halogen, in particular chloride, takes part in the polymerization process. Thus, more importantly, less halogen ends up in the resultant polymer, which has a favorable effect on the corrosive behavior of the polymer obtained.

The type of aluminum alkyl halide used in the catalyst of the present invention is also dependent on the nature of the transition metal component. For example, when the transition metal component of the catalyst is a vanadium component containing at least two halogen atoms that are bound to the vanadium atom, the aluminum alkyl halide component is preferably a trialkyl aluminum, more preferably triethylaluminum (TEA).

According to the present invention, the polymers and especially the amorphous copolymers obtained under standard conditions differ substantially from one another depending on the type of catalyst chosen and the nature thereof. This phenomenon does not occur in the case of known catalysts in the art. In the case of a catalyst according to the present invention there hence appears to be another active catalytic center that was not previously known.

The catalyst of the present invention can be added to a polymerization reactor either in dissolved form (in which case use is preferably made of a solvent that can also be used in the corresponding liquid-phase polymerization) or in a form in which at least one of the components is bound to a support.

Several methods that are known per se are available for a person skilled in the art. Examples of supports suitable for use in the present invention include, but are not limited to, silica, alumina, zeolite, and $MgC_2l$. This so-called heterogenizing of the catalyst makes it possible to carry out the polymerization in a slurry or as a gas-phase process.

The catalyst can be modified in different ways to make it more suitable for the preparation of the polymer or copolymer referred to hereinabove.

For example, the catalyst can also contain a promoter, that is, a compound which improves the polymerization yield of a catalyst. Halogenated compounds are particularly suitable for this purpose. In order to ensure that the copolymer to be prepared does not contain too much halogen, specific compounds with a low halogen content can be used as promoters. Such promoters are preferably compounds with at most 2 halogen atoms per molecule, for example, alkyl or alkoxyalkyl esters of phenyl mono- or dihalogen acetic acid. Other suitable promoters are referred to in U.S. Pat. No. 4,435,552, which has already been mentioned.

The catalyst of the present invention can also contain a Lewis acid. Such an acid is also capable of increasing the catalytic activity of the vanadium/aluminum combination according to the invention. Examples of suitable Lewis acids include, but are not limited to, $AlCl_3$, $AlBr_3$, $GaCl_3$, $BCl_3$ and $SiCl_4$.

Another possibility is that the catalyst of the present invention contains a Lewis base. Like a Lewis acid, such a compound is capable of intensifying the catalytic activity. Examples of suitable Lewis bases include, but are not limited to, esters, ethers, ketones, alcohols, amines and the like.

Another possible way of influencing the catalytic activity is with the (partial) replacement of the halogen group(s) of the transition metal/imidoaryl complex by another ligand (e.g., the Y group in general formula I).

Examples of such ligands include, but are not limited to:
- an alkoxy group,
- an aryloxy group,
- an amine group or an amide group,
- an S compound (such as sulphide, sulphite, sulphate, thiol, sulphinate),
- a P compound (such as phosphine, phosphite, phosphate),
- cyclopentadienyl (substituted or unsubstituted), and
- an organometallic compound.

Those skilled in the art, taking note of what is mentioned herein and using simple experimentation can readily determine the suitability of these and other ligands for use in the present invention.

These modifications can be applied to the catalyst itself or can be carried out during the polymerization using methods known in the art.

The present invention also relates to a process in which a catalyst of the present invention is used in the preparation of an olefin polymer. In particular, the present invention is related to the preparation of a polymer, in which the monomer is selected from the group of α-olefins, internal olefins or di-olefins, and mixtures thereof. More particularly, the present invention relates to a process for the polymerization of α-olefins, preferably chosen from the group ethylene, propylene, butylene, pentene, heptene, octene and mixtures thereof. More particularly, the α-olefin is ethylene and/or propylene. This results in the formation of crystalline homo- and copolymers of polyethylene (like HDPE, LLDPE) as well as crystalline homo- and copolymers of polypropylene (PP as well as EMPP). All the monomers needed for these types of polymers and the process conditions to prepare these types of polymers are known to those skilled in the art.

Most preferred in the use of the present invention is the use of the process for the preparation of an amorphous copolymer of ethylene, an α-olefine and, optionally a diene, for example, in a liquid-phase copolymerization reaction. The preparation of said amorphous copolymer is representative of transition metal/organometal catalysts of the invention for producing both crystalline and amorphous olefin-polymers. An amorphous copolymer as used in the present invention is a copolymer which at room temperature and higher temperatures shows a crystallinity of at most 5%, as measured with the aid of differential scanning calorimetry (DSC). Preferably, the copolymer has a crystallinity of at most 1%.

Examples of suitable α-olefines that can be used in the present invention include, but are not limited to, ethylene, propylene, butene-1, pentene-1, hexene-1, octene-1 or the branched isomers thereof (for example 4-methylpentene-1), styrene, and α-methylstyrene. Mixtures of these alkenes can also be used, of which propylene and/or butene-1 are preferred.

A suitable diene for use in a copolymer includes, for example, a polyunsaturated compound which serves to introduce unsaturation into the polymer; as it contains at least two C=C bonds and can be both aliphatic and alicyclic. Aliphatic polyunsaturated compounds usually contain between 3 and 20 carbon atoms. The double bonds can be either conjugated or, preferably, non-conjugated.

Examples of such aliphatic polyunsaturated compounds include: 1,3-butadiene, isoprene, 2,3-dimethylbutadiene-1,3, 2-ethylbutadiene-1,3, piperylene, myrcene, allene, 1,2-butadiene, 1,4,9-decatrienes, 1,4-hexadiene, 1,5-hexadiene and 4-methylhexadiene-1,4. Aliphatic-cyclic (alicyclic) polyunsaturated compounds, which can contain a bridge group, can be both monocyclic and polycyclic.

Examples of such compounds include, but are not limited to, norbornadiene and its alkyl derivatives; the alkylidenenorbornenes, (in particular the 5-alkylidenenorbornenes-2), in which the alkylidene group contains between 1 and 20, preferably between 1 and 9 carbon atoms; the alkenylnorbornenes, (in particular the 5-alkenynorbornenes-2), in which the alkenyl group contains between 2 and 20 (preferably between 2 and 10) carbon atoms, for example vinylnorbornene, 5-(2'-methyl-2'butenyl)-norbornene-2 and 5-(3'methyl-2'butenyl)norbornene-2; dicyclopentadiene and the polyunsaturated compounds of bicyclo-(2,2,1)-heptane, bicyclo-(2,2,2)-octane, bicyclo-(3,2,1)-octane and bicyclo-(3,2,2)-nonane, in which at least one of the rings is unsaturated. In addition, compounds like 4,7,8,9-tetrahydroindene and isopropylidenetetrahydroindene can be used in the present invention. In particular, use is made of dicyclopentadiene, 5-methylene- or 5-ethylidenenorbornene-2, or hexadiene-1,4. Mixtures of the compounds described above can also be used.

The diene can be present in the copolymer in amounts of up to 20 wt. %, preferably up to 10 wt. %.

In addition to or instead of the diene, an unsaturated compound with one or more functional groups, (for example halogen atoms, OH, OR, COOH, COOR or $NH_2$ groups), can be included in the copolymer in an amount of up to 20 wt. %. Such functional monomers generally have an adverse effect on the activity of the polymerization catalyst. However, when the catalyst of the present invention is used in the presence of a promoter, a reasonable polymerization rate is obtained even when the copolymerization mixture contains functional monomers.

The molar ratio of the monomers used in the present invention depends on the desired composition of the copolymer. Because the polymerization rate of the monomers differs considerably, it is not possible to give universally applicable ranges of molar ratios. However, molar ratios for particular monomers are readily determined by those skilled in the art. For example, in the copolymerization of ethylene and propylene a molar ratio of between 1:1 and 1:5 is preferred. If a polyunsaturated compound is copolymerized, the molar ratio relative to ethylene is preferably between 0.0001:1 and 1:1.

The copolymerization reaction is usually carried out at a temperature between −40° and 200° C., preferably between 10° and 80° C. The preferred pressure will usually be 0.1 to 5 MPa, however, it is also possible to use higher or lower pressures. Preferably the process is carried out continuously, but it can also be effected semi-continuously or batchwise.

The residence time of the copolymerization reaction can vary from a few seconds to several hours. A residence time of between a few minutes and an hour is usually preferred.

The copolymerization can take place in a liquid that is inert with respect to the catalyst, for example, one or more saturated aliphatic hydrocarbons (such as butane, pentane, hexane, heptane, pentamethylheptane or petroleum fractions); aromatic hydrocarbons (for example, benzene or toluene,); or halogenated aliphatic or aromatic hydrocarbons (such as tetrachloroethylene). It is possible to use such a temperature and pressure that one or more of the monomers used, in particular the α-olefine, for example propylene, is liquid and is present in such a large amount that it serves as a dispersing agent. No other dispersing agent needs then be used. The process according to the invention can be carried out in a polymerization reactor filled with gas and liquid or in a reactor filled entirely with liquid. Use of a heterogenized catalyst of the present invention makes it possible to carry out the polymerization process in a suspension or in the gas phase.

The molecular weight of the polymer obtained can be set using methods known by a person skilled in the art. In particular, this can be done by using chain length regulators such as diethylzinc and, preferably, hydrogen. Very small amounts of hydrogen usually control the molecular weight to a sufficient extent.

Unexpectedly, it has been found that in the case of liquid-phase processes the catalyst of the present invention is very suitable for use in the preparation of amorphous copolymer of ethylene and an α-olefine at room temperature or even higher temperatures, which means that the reaction heat can be eliminated in a more efficient manner than in the conventional liquid-phase processes. As is known in the art, this can be done by greatly cooling the feed of the reactors or by evaporating a portion of the reaction medium. After copolymerization, the copolymer can be processed further in different ways. For example, the evaporation of the solvent and coagulation with the aid of steam can both be used with liquid-phase processes.

The amorphous copolymers obtained using the process of the present invention usually contain between 25 and 85 wt. % ethylene. Products with an ethylene content of between 40 and 75 wt. % are preferred. Such copolymers can be used for various purposes, for example for the production of hoses, conveyor belts, and sealing profiles. If so desired, the copolymers can be vulcanized using standard methods known in the art, using substances that yield free radicals, for example peroxides, or using sulphur or other vulcanizing agents such as phenolic resins.

It is possible to extend the copolymer with oil to make the product processable as a rubber. This is preferably done during the copolymerization. For example, agents can be added to the copolymer to obtain a so-called friable bale. This can be done by adding, for example, talc. Such a result can also be obtained with a composition which comprises an inorganic separating agent, a thickener and an inorganic dispersing agent, as shown in, for example, EP-A-427,339. Such a composition is very suitable for use with the products of the present invention. Such a composition is also described in U.S. Pat. No. 4,233,365.

EXAMPLES

The present invention will be described below on the basis of the following examples and comparative experiments, without being limited hereto.

The codes and abbreviations used in the examples and tables have the following meanings:

Cat 1 = o,o-diisopropylphenylimido vanadium trichloride;
Cat 2 = phenylimido vanadium trichloride;
DCPAE = dichlorophenyl acetic ethyl ester;
SEAC = ethylaluminum sesquichloride;
TEA = triethylaluminum; and
$C_3$ cont. = the weight percentage of the propylene units in the polymer.

Example 1

A 1 liter glass autoclave was filled with 300 ml of gasoline and 0.025 mmole of cat 1. The reactor was brought to a pressure of 8 bar with the aid of purified monomers and was conditioned so that the propylene-:ethylene ratio in the gas hood was 2:1. The temperature of the reactor was 30° C. Then TEA was added to the reactor contents, after which 0.025 mmoles of DCPAE were immediately added. During the polymerization the concentrations of the monomers were kept as constant as possible by supplying propylene (200 nl/hr) and ethylene (100 nl/hr) to the reactor. After 30 minutes of polymerization the reactor was depressurized, the solution was collected and dried. An amorphous copolymer of ethylene and propylene was obtained. Table 1 shows the supplied amounts of TEA and the polymer data.

TABLE 1

| Example No. | cat 1 (mmole) | TEA (mmole) | DCPAE (mmole) | Yield (grams) | $C_3$ cont. (wt. %) |
|---|---|---|---|---|---|
| 1.1 | 0.025 | 0.100 | 0.025 | 7.1 | 28.4 |
| 1.2 | 0.025 | 0.075 | 0.025 | 10.0 | 35.3 |
| 1.3 | 0.025 | 0.050 | 0.025 | 12.5 | 41.0 |
| 1.4 | 0.025 | 0.030 | 0.025 | 12.8 | 45.4 |

These results show that the catalyst becomes more active as less Al alkyl co-catalyst (TEA) is added. In addition, a different polymer is formed at lower Al alkyl (TEA) concentrations than at higher concentrations.

Example 2

Use was made of the same polymerization setup as in Example 1. The various catalyst components were now supplied in a different order. In some cases the V catalyst component was supplied together with a Lewis acid ($BCl_3$). After conditioning, the promoter DCPAE was supplied first, followed by the co-catalyst (TEA). Table 2 shows the amounts of catalyst components and the results.

TABLE 2

| Example No. | cat 1 (mmole) | TEA (mmole) | $BCl_3$ (mmole) | DCPAE (mmole) | Yield (grams) | $C_3$ cont. (wt. %) |
|---|---|---|---|---|---|---|
| 2.1 | 0.025 | 0.025 | 0.025 | 0 | 0 | |
| 2.2 | 0.025 | 0.030 | 0.025 | 0.025 | 0 | |
| 2.3 | 0.025 | 0.050 | 0.025 | 0.025 | 10.7 | 44.8 |
| 2.4 | 0.025 | 0.025 | 0 | 0.075 | 2.5 | |
| 2.5 | 0.025 | 0.050 | 0 | 0.075 | 9.5 | |
| 2.6 | 0.025 | 0.075 | 0 | 0.075 | 11.2 | 43.3 |

These results show that a Lewis acid (BCl$_3$) and/or a Lewis base (DCPAE) affect the activity of the Al alkyl (TEA) so that the effective amount of Al alkyl (TEA) available for the alkylation of the vanadium component decreases. This can be (partly) compensated for by increasing the absolute amount of Al.

Example 3

Example 1 was repeated, with the exception that cat 1 was replaced by cat 2. (See Table 3 for the different amounts of catalyst components.)

Again a clear and amorphous copolymer was obtained. The yield was 6.3 grams; C$_3$ content=30.3%.

These results show that the o,o-disubstituted vanadium component (cat 1) presents advantages compared with the unsubstituted one (cat 2).

TABLE 3

| Example No. | V cat (mmole) | TEA (mmole) | DCPAE (mmole) | Yield (grams) | C$_3$ cont. (wt. %) | V cat type |
|---|---|---|---|---|---|---|
| 3.1 | 0.025 | 0.050 | 0.025 | 6.3 | 30.3 | (2) |
| 1.3 | 0.025 | 0.050 | 0.025 | 12.5 | 41.0 | (1) |

Example 4

Example 2 was repeated, with the exception that different V compounds were used. In addition, TEA was replaced by SEAC. (Table 4 shows the amounts of catalyst components and the results.)

TABLE 4

| Example No. | V comp. | mmole | SEAC (mmole) | DCPAE (grams) | Yield (wt. %) | C$_3$ cont. |
|---|---|---|---|---|---|---|
| 4.1 | cat 1 | 0.025 | 0.1 | 0.025 | 3.3 | 35 |
| 4.2 | cat 1 | 0.006 | 1.0 | 0.025 | 8.4 | 40 |
| 4.3 | VOCl$_3$ | 0.006 | 0.1 | 0.025 | 9.3 | 40 |
| 4.4 | VOCl$_3$ | 0.006 | 1.0 | 0.025 | 10.5 | 40 |

These results show that a vanadium/imidoaryl complex with high aluminum alkyl halide concentrations leads to the formation of a polymer that has the same properties as the polymer obtained with the standard catalyst system, in which use is made of VOCl$_3$ as the vanadium component. In this case the activities are also comparable. Indirectly it also appears that the active center that is formed in the reaction between a vanadium/imidoaryl complex and the aluminum alkyl halide differs, depending on the type of aluminum halide used. Different polymers are formed when TEA is replaced by SEAC.

All publications mentioned hereinabove are hereby incorporated by reference. While the foregoing invention has been described in some detail for purposes of clarity and understanding, it will be appreciated by one skilled in the art that various changes in form and detail can be made without departing from the true is cope of the invention.

What is claimed is:

1. Process for the preparation of an olefin polymer comprising polymerizing an olefin or mixtures of olefins with the aid of a catalyst, wherein the catalyst comprises a vanadium component and an organometal component, the vanadium component comprises a vanadium atom onto which an imidoaryl ligand is bound to form a complex, the metal in the organometal component is a metal from Group 1, 2, 12 or 13 of the Periodic Table of Elements, and the imidoaryl ligand is an o,o-disubstituted phenyl group.

2. Process according to claim 1, wherein the olefin is selected from the group consisting of α-olefin internal olefin, diolefin and mixtures thereof.

3. Process according to claim 2, wherein the α-olefin is selected from the group consisting of butene, pentene, heptene, octene, ethylene, propylene and mixtures thereof.

4. Process according to claim 3, wherein a polymer is prepared with ethylene and/or propylene as monomers.

5. The process according to claim 1, wherein the organometal component is an organo aluminum compound.

6. The process according to claim 1, wherein the process is conducted in the presence of a promoter.

7. The process according to claim 6, wherein the promoter contains at most two halogen atoms per molecule.

8. The process according to claim 1, wherein at least one component of the catalyst is bound to a support.

9. Process for the preparation of an amorphous copolymer comprising the steps of copolymerizing ethylene, an α-olefin and, optionally, a diene with the aid of a catalyst, wherein the catalyst comprises a vanadium component and an organo aluminum component, the vanadium component comprises a vanadium atom onto which an imidoaryl ligand is bound, and the aryl group in the imidoaryl ligand is an o,o-disubstituted phenyl group.

10. The process according to claim 9, wherein the organometal component is an organo aluminum compound.

11. The process according to claim 9, wherein the vanadium component comprises at least two halogen groups that are bound to the vanadium atom.

12. The process according to claim 9, further comprising a Lewis acid or a Lewis base.

13. The process according to claim 12, wherein the atomic ratio of the vanadium and the aluminum is between 3:1 and 1:3.

14. The process according to claim 9, wherein the aluminum component is trialkylaluminum.

15. The process according to claim 12, wherein the atomic ratio of the vanadium and the aluminum is between 1:1 and 1:2.

16. The process according to claim 9, wherein the process is conducted in the presence of a promoter.

17. The process according to claim 16, wherein the promoter contains at most two halogen atoms per molecule.

18. The process according to claim 9, wherein at least one component of the catalyst is bound to a support.

* * * * *